US010135347B2

(12) United States Patent
Mizoe et al.

(10) Patent No.: US 10,135,347 B2
(45) Date of Patent: Nov. 20, 2018

(54) SWITCHING POWER SUPPLY DEVICE

(71) Applicant: NEW JAPAN RADIO CO., LTD., Chuo-ku, Tokyo (JP)

(72) Inventors: Kimiyoshi Mizoe, Fujimino (JP); Toru Konno, Fujimino (JP); Akinobu Aikawa, Fujimino (JP)

(73) Assignee: NEW JAPAN RADIO CO., LTD., Tokyo (JP)

( * ) Notice: Subject to any disclaimer, the term of this patent is extended or adjusted under 35 U.S.C. 154(b) by 0 days.

(21) Appl. No.: 15/859,915

(22) Filed: Jan. 2, 2018

(65) Prior Publication Data
US 2018/0191255 A1    Jul. 5, 2018

(30) Foreign Application Priority Data

Jan. 4, 2017    (JP) ................. 2017-000045
Feb. 28, 2017   (JP) ................. 2017-036576

(51) Int. Cl.
*H02M 3/335*    (2006.01)
*H02M 1/08*     (2006.01)

(52) U.S. Cl.
CPC ......... *H02M 3/33523* (2013.01); *H02M 1/08* (2013.01); *H02M 3/33507* (2013.01)

(58) Field of Classification Search
CPC ........ H02M 1/08; H02M 1/088; H02M 1/092; H02M 3/33507; H02M 3/33523
See application file for complete search history.

(56) References Cited

U.S. PATENT DOCUMENTS

| 7,746,673 | B2* | 6/2010 | Grant ................ H02M 3/33515 363/21.12 |
| 9,093,918 | B2* | 7/2015 | Yang .................... H02M 1/4258 |
| 2016/0105116 | A1* | 4/2016 | Chang ............... H02M 3/33523 363/21.13 |
| 2018/0034378 | A1* | 2/2018 | Lin ................... H02M 3/33523 |

FOREIGN PATENT DOCUMENTS

JP    2005027412 A    1/2005

* cited by examiner

*Primary Examiner* — Matthew Nguyen
(74) *Attorney, Agent, or Firm* — Procopio, Cory, Hargreaves & Savitch LLP

(57) ABSTRACT

A switching power supply device includes a switching transistor, a sense resistor connected to the switching transistor in series and on which a sense voltage generates when the switching transistor is turned on, a transformer including a first winding to which an input voltage is applied when the switching transistor is turned on and a second winding connected to a load, an optocoupler in which an optocoupler current is generated based on an output voltage on the second winding side, a load power detection circuit that generates a load power signal in accordance with a turn-on period of the switching transistor, a turn-on period control circuit, a turn-off period control circuit, and an SRFF circuit.

14 Claims, 12 Drawing Sheets

SWITCHING POWER SUPPLY DEVICE

CROSS REFERENCE TO RELATED APPLICATIONS

This application claims priority from Japanese Patent Application No. 2017-000045 filed on Jan. 4, 2017 and Japanese Patent Application No. 2017-036576 filed on Feb. 28, 2017, the entire contents of which are incorporated herein by reference.

BACKGROUND OF THE INVENTION

Field of the Invention

The present invention relates to a switching power supply device as a DC/DC converter using a transformer and an optocoupler.

Description of Related Art

FIG. 13 shows a circuit of a switching power supply device of a related art (for example, the patent document 1: JP-A-2005-027412). Reference numeral 50 denotes a transformer, and includes a first winding L11, a first auxiliary winding L12, a second winding L13, and a second auxiliary winding L14. Reference numeral MN2 denotes an NMOS switching transistor, and reference numeral 60 denotes an optocoupler including a photodiode PD2 and a phototransistor PT2. Reference numerals R11 to R19 denote a resistor, reference numeral Rs2 denotes a sense resistor that detects a drain current of the switching transistor MN2, and reference numerals C11 to C14 denote a capacitor.

In this switching power supply device, when a voltage obtained by dividing an output voltage Vout by the resistors R18 and R19 is higher than a reference voltage Vref11 of a voltage source VB11, an output voltage of an operational amplifier OP11 is decreased in accordance with a difference voltage therebetween. When the output voltage of the operational amplifier OP11 is equal to or less than a predetermined value, a current flows to the photodiode PD2 of the optocoupler 60 in accordance with the value of the output voltage, and the internal resistance of the phototransistor PT2 is determined in accordance with the amount of light emitted from the photodiode.

When a power supply voltage Vin is applied, the capacitor C13 is charged such that the resistor R13 side is set to a positive polarity by an excitation current flowing to the first auxiliary winding L12 through the resistors R11 and R13. When the voltage of the capacitor C13 on the resistor R13 side reaches a threshold voltage of the switching transistor MN2, the switching transistor MN2 is turned on.

Thereby, when a current starts to flow from the DC voltage Vin to the first winding L11 connected to the switching transistor MN2, an induced electromotive force is generated in the windings L12, L13, and L14 of the transformer 50, and energy is accumulated in the transformer 50. An induced voltage (a • side is a positive polarity) which is generated in the first auxiliary winding L12 overlaps the voltage of the capacitor C13, and thus the switching transistor MN2 is kept in a turn-on state by the gate voltage thereof being maintained at a voltage equal to or greater than a threshold voltage.

In this case, a drain current of the switching transistor MN2 flows to the sense resistor Rs2, and a sense voltage generated therein charges the capacitor C12 through the resistor R15. An excitation current flowing to the first winding L11 substantially linearly increases with time after the switching transistor MN2 is turned on, and the voltage of the capacitor C12 also rises accordingly.

Thereafter, when the voltage of the capacitor C12 reaches a threshold voltage of a transistor Q11, the transistor Q11 is set to be in a turn-on state, and thus the switching transistor MN2 is turned off by the gate voltage thereof being decreased to a voltage equal to or less than the threshold voltage.

When a current flowing to the first winding L11 is cut off by the switching transistor MN2 being turned off, a flyback voltage is generated in each of the windings L11 to L14. In this case, the flyback voltage generated in the second winding L13 is rectified and smoothed by the diode D11 and the capacitor C14 and is output as an output voltage Vout.

On the other hand, the flyback voltage generated in the first auxiliary winding L12 has a proportional relation to the flyback voltage generated in the second winding L13, the capacitor C13 is charged through the resistors R12 and R13 such that the resistor R13 side is set to a positive polarity by the flyback voltage (a • side is a negative polarity) which is generated in the first auxiliary winding L12, and run-up for turning on the switching transistor MN2 proceeds.

Meanwhile, phototransistor after the switching transistor MN2 is turned off, a voltage of the sense resistor Rs2 by the current from the first winding L11 is not generated. Moreover, the capacitor C12 is discharged by the current through the resistors R15 and Rs2 because the phototransistor PT2 is not operated as the output voltage Vout is low. Thereby, when the voltage of the capacitor C12 is set to be equal to or less than the threshold voltage of the transistor Q11, the transistor Q11 is turned off.

Incidentally, a portion between a base and a collector of the transistor Q11 operates as an equivalent diode, and thus the capacitor C13 is also charged such that the resistor R13 side is set to be a positive polarity by a current flowing through the sense resistor Rs2, the resistor R15, the base and the collector of the transistor Q11, and the resistor R13 from a side opposite to the • side of the first auxiliary winding L12.

When the discharge of electric energy accumulated in the second winding L13 by flyback is terminated, the voltage of the first winding L11 starts a ringing in discontinuous conduction mode based on an input voltage Vin by parasitic capacitance of the switching transistor MN2, stray capacitance within the first winding L11, and inductance of the first winding L11, and the polarity of the voltage is inversed with a drop of the voltage.

When a voltage on the capacitor C13 side of the first auxiliary winding L12 that a ringing in discontinuous conduction mode in proportion to the ringing in discontinuous conduction mode of the voltage of the first winding L11 similarly changes and the polarity thereof returns after the flyback voltage is finished, the voltage operates as a voltage in a forward direction with respect to the gate of the switching transistor MN2. In addition, the voltage of the capacitor C13 charged up to that time is added to the above-mentioned voltage, the switching transistor MN2 is turned on again when the total voltage exceeds the threshold voltage of the switching transistor MN2. In this manner, a series of RCC is repeated.

Since the output voltage Vout is low so far and the optocoupler 60 is not operated, the phototransistor PT2 does not affect a base voltage of the switching transistor MN2, and the switching transistor MN2 is operated in a maximum turn-on period which is determined on the basis of a resistance value of the sense resistor Rs2. Thereafter, the output voltage Vout rises every time the oscillation thereof is repeated, and a comparison operation of the operational amplifier OP11 is started when the output voltage exceeds a set voltage corresponding to the voltage Vref11, thereby transitioning to a normal operation in which the optocoupler 60 is operated.

In this normal operation, when the output voltage Vout is higher than the set voltage, the voltage of the capacitor C12 is also charged by a current flowing to the phototransistor PT2 of the optocoupler 60, in addition to being charged by the voltage generated in the sense resistor Rs2. For this reason, a turn-on timing of the transistor Q11 becomes earlier as the output voltage Vout becomes higher, and thus a turn-off timing of the switching transistor MN2 becomes earlier. That is, a turn-on period of the switching transistor MN2 is shortened.

When the switching transistor MN2 is turned off, the switching transistor MN2 is kept in a turn-off state until a voltage on the resistor R13 side of the capacitor C13 which is charged by the flyback voltage of the first auxiliary winding L12 reaches the threshold voltage of the switching transistor MN2.

Meanwhile, in the switching power supply device, when a voltage obtained by dividing the input voltage Vin by the resistors R11 and R12 is less than a predetermined value, a bias voltage of the switching transistor MN2 is decreased, and the switching transistor MN2 does not perform turn-on and turn-off operations.

[Patent Document 1] JP-A-2005-027412

According to a related art, a switching power supply device requires a first auxiliary winding L12 in order to generate a turn-on timing of a switching transistor MN2. In addition, voltage of a capacitor C13 on a resistor R13 side controls a gate of the switching transistor MN2, and thus there is a problem in which the turn-on timing of the switching transistor MN2 is affected by variations in a threshold value of the switching transistor MN2. In addition, the switching transistor MN2 is turned off when a charged voltage of the capacitor C12 reaches a threshold value of a transistor Q11, and thus there is a problem in that a turn-off timing of the switching transistor MN2 is affected by variations in the threshold value of the transistor Q11. In addition, a second auxiliary winding L14 is particularly required in order to obtain an optocoupler current.

SUMMARY

One or more embodiments provide a switching power supply device which does not necessarily require a first auxiliary winding for generating a turn-on timing of a switching transistor and a second auxiliary winding for obtaining an optocoupler current, and prevents turn-on and turn-off of the switching transistor from being affected by variations in a threshold value of the switching transistor.

In an aspect (1), one or more embodiments provide a switching power supply device including a switching transistor, a sense resistor connected to the switching transistor in series and on which a sense voltage generates when the switching transistor is turned on, a transformer including a first winding to which an input voltage is applied when the switching transistor is turned on and a second winding connected to a load, an optocoupler in which an optocoupler current is generated based on an output voltage on the second winding side, a load power detection circuit that generates a load power signal in accordance with a turn-on period of the switching transistor, a turn-on period control circuit, a turn-off period control circuit, and a Set-Reset flip-flop (SRFF) circuit. The turn-on period control circuit generates a turn-off timing signal at an earlier timing as a current value of the optocoupler current is larger and a voltage value of the sense voltage is larger, the turn-off timing signal being a signal so as to turn off the switching transistor after the switching transistor is turned on The turn-off period control circuit generates a turn-on timing signal at an earlier timing as the current value of the optocoupler current is smaller and a current value of load power signal is larger, the turn-on timing signal being a signal so as to turn on the switching transistor after the switching transistor is turned off. The SRFF circuit turns off the switching transistor in accordance with the turn-off timing signal output from the turn-on period control circuit and turns on the switching transistor in accordance with the turn-on timing signal output from the turn-off period control circuit. Turn-on and turn-off timings of the switching transistor are controlled in accordance with the voltage value of the sense voltage, the current value of the optocoupler current, and the current value of the load power signal.

In an aspect (2), the switching power supply device further including an auxiliary winding provided in the transformer and an inversion detection circuit. The inversion detection circuit generates a pulse signal in which a pulsating voltage generated in the auxiliary winding is waveform-shaped and which transitions at a timing of a valley of a ringing in discontinuous conduction mode (DCM) of a drain voltage of the switching transistor. The turn-off period control circuit performs re-timing of the turn-on timing signal at a transition timing of the pulse signal.

In an aspect (3), the switching power supply device further including an input voltage determination circuit detecting a level of the input voltage. The turn-on period control circuit generates the turn-off timing signal at an earlier timing as the level of the input voltage determined by the input voltage determination circuit is higher.

In an aspect (4), the switching power supply device further including a time-out circuit. The time-out circuit generates a mode switching signal when the turn-on timing signal is generated in the turn-off period control circuit after a first predetermined time elapses from when the turn-off timing signal is generated in the turn-on period control circuit. The turn-on period control circuit generates the turn-off timing signal after a second predetermined time elapses from when the switching transistor is turned on, when the mode switching signal is generated in the time-out circuit, regardless of the current value of optocoupler current and the voltage value of the sense voltage.

In an aspect (5), the turn-off period control circuit generates the turn-on timing signal at a later timing as the current value of the optocoupler current is larger, when the mode switching signal is generated in the time-out circuit, regardless of the load power signal.

In an aspect (6), the turn-on period control circuit includes a fourth capacitor which is charged to a first predetermined voltage when the switching transistor is turned off and which is discharged by the optocoupler current when the switching transistor is turned on, and a first comparator which generates the turn-off timing signal when a voltage value of the fourth capacitor is lower than a voltage value corresponding to the sense voltage.

In an aspect (7), the turn-on period control circuit includes a fourth capacitor which is charged to a lower voltage as a voltage value of the input voltage determined by the input voltage determination circuit is larger when the switching transistor is turned off and which is discharged by the optocoupler current when the switching transistor is turned on, and a first comparator which generates the turn-off timing signal when a voltage value of the fourth capacitor is lower than a voltage value corresponding to the sense voltage.

In an aspect (8), the turn-on period control circuit includes a sixth resistor in which a voltage based on the current value of the optocoupler current flowing is generated when the switching transistor is turned on, and a first comparator which generates the turn-off timing signal when a voltage value of the voltage generated in the sixth resistor exceeds the voltage value of the sense voltage.

In an aspect (9), the turn-on period control circuit includes a sixth capacitor which is charged with a constant current when the switching transistor is turned on and which is discharged when the switching transistor is turned off, and a second comparator which generates the turn-off timing signal when a voltage value of a charged voltage of the sixth capacitor exceeds a first reference voltage value.

In an aspect (10), the turn-on period control circuit includes a sixth capacitor which is charged with a larger current as the input voltage is larger when the switching transistor is turned on and which is discharged when the switching transistor is turned off, and a second comparator which generates the turn-off timing signal when a voltage value of a charged voltage of the sixth capacitor exceeds a first reference voltage value.

In an aspect (11), the turn-off period control circuit includes a fifth capacitor which is charged by a load power detection signal when the switching transistor is turned off and which is discharged when the switching transistor is turned on, a fourth resistor which is inserted into a path in which charge of the fifth capacitor is discharged by the optocoupler current, a third comparator which compares a voltage value of a terminal on a side opposite to a side of the fifth capacitor of the fourth resistor with a third reference voltage value, and a first Delayed Flip-flop (DFF) circuit which performs re-timing of an output signal of the third comparator at the transition timing of the pulse signal of the inversion detection circuit. The turn-on timing signal is generated from the first DFF circuit.

In an aspect (12), the turn-off period control circuit includes a second voltage source, a fourth resistor which is inserted into a current path of the optocoupler current flowing from the second voltage source, and a third comparator which compares a voltage value of a terminal on a side opposite to a side of the second voltage source of the fourth resistor with a third reference voltage value. The turn-on timing signal is generated from the third comparator.

In an aspect (13), the inversion detection circuit includes a minimum voltage regulation circuit which regulates a minimum voltage value when the pulsating voltage generated in the auxiliary winding is a negative voltage, a maximum voltage regulation circuit which regulates a maximum voltage value when the pulsating voltage generated in the auxiliary winding is a positive voltage, and a fourth comparator which compares a voltage value of a value generated in the auxiliary winding and regulated by the minimum voltage regulation circuit and the maximum voltage regulation circuit with a fifth reference voltage value and which performs waveform-shaping of the voltage so as to generate the pulse signal.

In an aspect (14), the time-out circuit includes a timer circuit which generates a timer signal for the first predetermined time whenever the turn-off timing signal is input, and a second Delayed Flip-flop (DFF) circuit which generates the mode switching signal when the turn-on timing signal is input and the timer signal is not generated by the timer circuit.

According to one or more embodiments, it is possible to take in and process an optocoupler current, a load power signal based on a turn-on period of a switching transistor, and a sense voltage and to generate a turn-on timing signal or a turn-off timing signal of the switching transistor, and thus a second auxiliary winding is not necessarily required. In addition, the turn-on and turn-off of the switching transistor are controlled by driving a Set-Reset flip-flop (SRFF) circuit in accordance with the turn-on timing signal and the turn-off timing signal, and thus turn-on and turn-off timings of the switching transistor are not affected by variations in the threshold values thereof.

In addition, when an inversion detection circuit is newly provided in an auxiliary winding path, it is possible to perform re-timing of the turn-on timing signal in accordance with a pulse signal, which is obtained by performing waveform-shaping of a pulsating voltage of the auxiliary winding, and to cause the switching transistor to perform a quasi-resonance operation by turning on the switching transistor in a valley of a ringing in discontinuous conduction mode (DCM) of a drain voltage, and thus it is possible to eliminate the influence of variations in the threshold value of the switching transistor during the quasi-resonance operation. In this regard, in the switching power supply device in FIG. 13, although the switching transistor is configured to be turned on in a valley of pulsation of a drain voltage of the switching transistor, in which valley the switching transistor is to be turned on depends on a threshold voltage of the switching transistor, and thus the quasi-resonance operation is affected by the threshold value of the switching transistor.

Further, when a time-out circuit is newly provided, it is possible to perform control for making a turn-on time constant and making a turn-off time variable in a "light load" in which turn-on and turn-off cycles are set to be equal to or greater than a predetermined value. Accordingly, frequencies of the turn-on and turn-off cycles set to be the predetermined value are set to be equal to or greater than an audible frequency, and thus it is possible to prevent audible frequency noise from being generated in a "normal load".

Further, in the switching device in FIG. 13, a switching operation of the switching transistor is stopped in a case where an input voltage does not reach a predetermined value, but it is possible to control a turn-on period in accordance with the input voltage by newly providing an input voltage determination circuit in the invention.

DETAILED DESCRIPTION

First Embodiment

Figure 1:
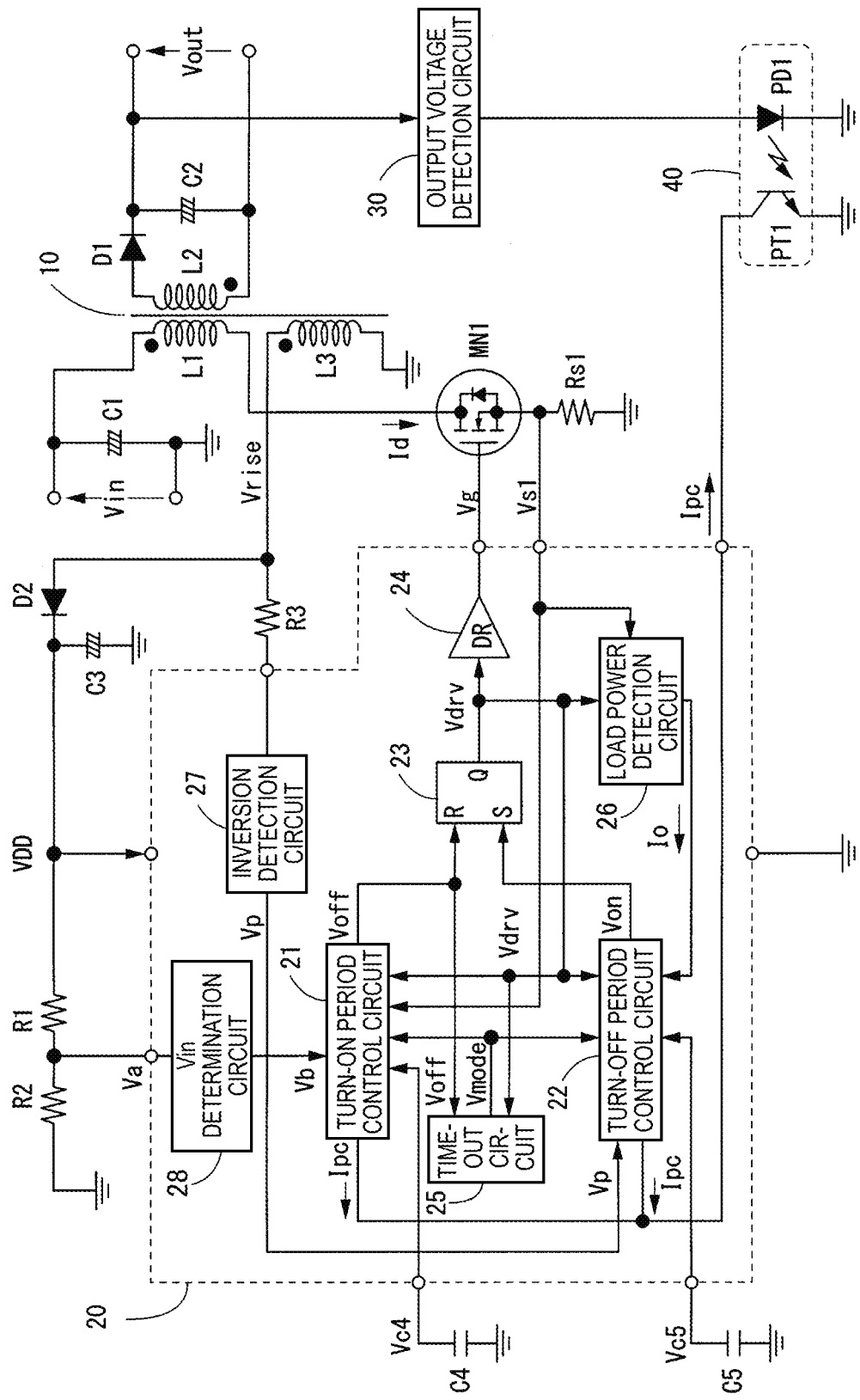
FIG. 1 is a block diagram illustrating a configuration of a switching power supply device according to a first embodiment.

FIG. 1 shows a configuration of a switching power supply device according to a first embodiment of the invention. Reference numeral 10 denotes a transformer including a first winding L1, a second winding L2, and an auxiliary winding L3. An input DC voltage Vin stabilized by a capacitor C1 is input to the first winding L1, and the first winding L1 transmits electromagnetic energy generated by turn-on and turn-off operations of an NMOS switching transistor MN1 to the windings L2 and L3. A rectification smoothing circuit is constituted by a diode D1 and a capacitor C2 in the second winding L2, and an output DC voltage Vout is extracted from the rectification smoothing circuit. A rectification smoothing circuit is constituted by a diode D2 and a capacitor C3 in the auxiliary winding L3, and a voltage VDD is generated from the rectification smoothing circuit.

Reference numeral 20 denotes a control circuit that controls the turn-on and turn-off of the switching transistor MN1. In the control circuit 20, reference numeral 21 denotes a turn-on period control circuit that controls a time for which the switching transistor MN1 is kept in a turn-on state and outputs a turn-off timing voltage Voff, and reference numeral 22 denotes a turn-off period control circuit that controls a time for which the switching transistor MN1 is kept in a turn-off state and outputs a turn-on timing voltage Von. The turn-on period control circuit 21 includes an external capacitor C4, and the turn-off period control circuit 22 includes an external capacitor C5.

Reference numeral 23 denotes a Set-Reset flip-flop circuit, and the SRFF circuit is reset by the turn-off timing voltage Voff, which is output from the turn-on period control circuit 21, being set to "H" and sets a driving voltage Vdrv, which is output from a Q terminal, to be "L". In addition, the SRFF circuit is reset by the turn-on timing voltage Von, which is output from the turn-off period control circuit 22, being set to "H" and sets the driving voltage Vdrv, which is output from the Q terminal, to "H".

Reference numeral 24 denotes a driving circuit that inputs a driving voltage Vdrv, which is output from the Q terminal of the SRFF circuit 23, to generate a gate voltage Vg for turning on and turning off the switching transistor MN1. The driving circuit sets the gate voltage Vg to "H" when the driving voltage Vdrv is set to be "H", to turn on the switching transistor MN1, and sets the gate voltage Vg to be "L" when the driving voltage Vdrv is set to be "L", to turn off the switching transistor MN1.

Reference numeral 25 denotes a time-out circuit, and the time-out circuit takes in the driving voltage Vdrv which is output from the SRFF circuit 23 and the turn-off timing voltage Voff which is output from the turn-on period control circuit 21. At the time-out circuit, the time from getting the pulse signal of the voltage Voff to getting the drive voltage Vdrv set to "H" (the turn-off period of the switching transistor MN1) is compared with a predetermined time T1; in a case that that time is over the time T1, the voltage Vmode for switching mode is set to "H" as the "light load", in another case, that time is under the time T1, the voltage Vmode for switching mode is set to "L" as the "nomal load", and the voltage Vmode outputs the set voltage to the turn-on period control circuit 21 and the turn-off period control circuit 22.

Reference numeral 26 denotes a load power detection circuit. The load power detection circuit inputs a sense voltage Vs1 generated in a sense resistor Rs1 that detects a drain current Id flowing to the switching transistor MN1, generates a load power signal (current) Io indicating excitation energy of the first winding L1 of the transformer 10 on the basis of a time for which the voltage Vs1 is generated, that is, a time for which the drain current Id flows, and outputs the generated signal to the turn-off period control circuit 22.

Reference numeral 27 denotes an inversion detection circuit. The inversion detection circuit takes in a pulsating voltage Vrise generated in the auxiliary winding L3 through a resistor R3 to generate a pulse voltage Vp having been subjected to waveform-shaping, and outputs the pulsating voltage to the turn-off period control circuit 22.

Reference numeral 28 denotes an input voltage determination circuit. The input voltage determination circuit takes in a voltage Va, which is obtained by dividing a voltage VDD by resistors R1 and R2, to determine an input voltage Vin, and outputs the determined voltage Vb to the turn-on period control circuit 21. The determined voltage Vb is a voltage that becomes lower as the input voltage Vin becomes higher.

Reference numeral 30 denotes an output voltage detection circuit that detects an output voltage Vout, and a current corresponding to the voltage detected here is supplied to a photodiode PD1 of an optocoupler 40. The phototransistor PT1 of the optocoupler 40 generates the amount of light emission of the photodiode PD1, that is, an optocoupler current Ipc proportional to the output voltage Vout, and outputs the generated optocoupler current to the turn-on period control circuit 21 and the turn-off period control circuit 22 of the control circuit 20.

Figure 2:
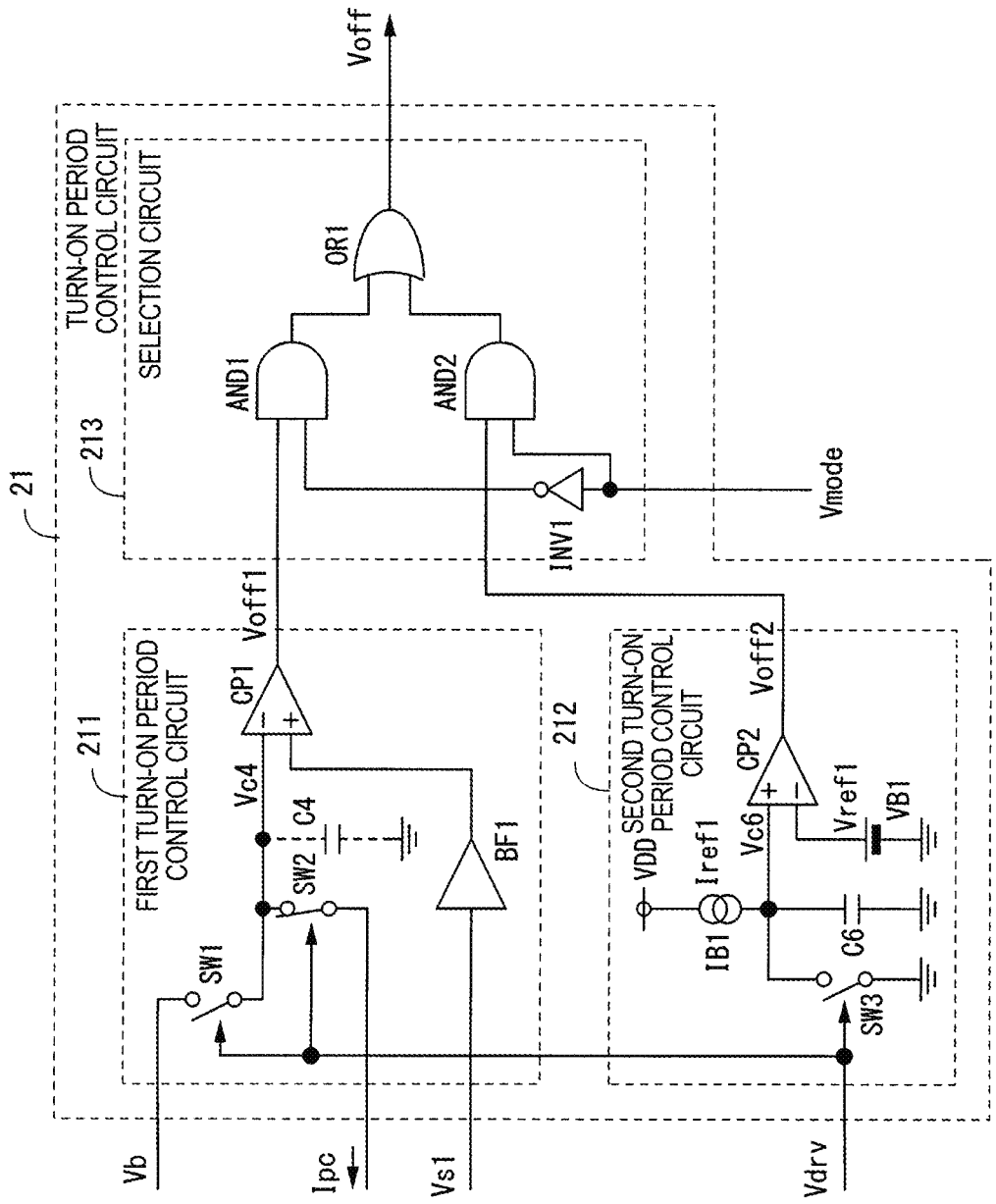
FIG. 2 is a circuit diagram of a turn-on period control circuit of the switching power supply device of FIG. 1.

FIG. 2 shows a detailed diagram of the turn-on period control circuit 21. The turn-on period control circuit 21 includes a first turn-on period control circuit 211 that outputs a turn-off timing voltage Voff1, a second turn-on period control circuit 212 that outputs a turn-off timing voltage Voff2, and a selection circuit 213 that selects either the output voltage Voff1 of the first turn-on period control circuit 211 or the output voltage Voff2 of the second turn-on period control circuit 212 in accordance with the mode switching voltage Vmode.

The first turn-on period control circuit 211 includes a switch SW1 which is turned off when the driving voltage Vdrv is set to "H", a switch SW2 which is turned on when the driving voltage Vdrv is set to "H", the external capacitor C4, a buffer BF1 that amplifies the sense voltage Vs1, and a comparator CP1.

A voltage Vc4 of the capacitor C4 is charged to an output voltage Vb of an input voltage determination circuit 28 through the switch SW1 which is turned on when the switching transistor MN1 is turned off. When the switching transistor MN1 is turned on, the switch SW1 is turned off and the switch SW2 is turned on, and thus the voltage Vc4 starts falling since the capacitor C4 is discharged by the optocoupler current Ipc. On the other hand, the sense voltage Vs1 is input to the buffer BF1, and the sense voltage Vs1 and the charged voltage Vc4 of the capacitor C4 are compared with each other by the comparator OP1. The comparator CP1 sets the turn-off timing voltage Voff1 to be "H" when the voltage Vc4 becomes lower than the sense voltage Vs1.

In this manner, at the first turn-on period control circuit 211, the on-time of the switching transistor MN1 is controlled to be short by means that makes a the a timing of the turn-off timing voltage Voff1 set to "H" is earlier as the output voltage Vb of the input voltage determination circuit 28 increases, the optocoupler current Ipc increases, and the sense voltage Vs1 increases. That is, a turn-on period of the switching transistor MN1 becomes shorter as the input voltage Vin becomes higher, as the output voltage Vout becomes higher, and the sense voltage Vs1 becomes higher.

The second turn-on period control circuit 212 includes a switch SW3 which is turned off when the driving voltage Vdrv is set to "H", a current source IB1 that supplies a current Iref1, a capacitor C6, and a comparator CP2 in which a voltage Vref1 is set as a reference value by the voltage source VB1.

Although a voltage Vc6 of the capacitor C6 is set to 0 V because the switch SW3 is turned on when the switching transistor MN1 is turned off, the switch SW3 is turned off when the switching transistor MN1 is turned on. Accordingly, when the voltage Vc6 is charged with a constant current by the current Iref1 of the current source IB1 to become higher in proportion to a time and become higher than the voltage Vref1 with the elapse of a predetermined time, the turn-off timing voltage Voff2 which is output from the comparator CP2 is set to "H". That is, a turn-on time second control circuit 212 sets the turn-off timing voltage Voff2 to be "H" when a fixed time elapses after the switching transistor MN1 is turned on. The fixed time is set to be a timing which is earlier than the earliest timing of the turn-off timing voltage Voff1 which is output from the turn-on time first control circuit 211. That is, the turn-on period is fixed to a minimum value.

The selection circuit 213 includes AND circuits AND1 and AND2, an OR circuit OR1, and an inverter INV1. When the mode switching voltage Vmode is set to "L" (normal load), the AND1 gate is available, therefore, the turn-off timing voltage Voff1 of the first turn-on period control circuit 211 which is set to "H" is selected as the output of the turn-off timing voltage Voff. In addition, when the mode switching voltage Vmode is set to be "H" (light load), the AND2 gate is available, therefore, the turn-off timing voltage Voff2 of the second turn-on period control circuit which is set to "H" is selected as the output of the turn-off timing voltage Voff.

That is, on the turn-on period control circuit 21, the off-switching timing of the transistor MN1 is controlled by the voltage Voff1; it becomes dynamically changed following load condition in the "normal load" state, other hand, in the timing "light load" state, the turn-off timing voltage Voff1 is changed from on signal to off signal when a determined period time is passed from a point of turn-on. In this manner, a turn-on period between a turn-on timing and a turn-off timing of the switching transistor MN1 is subjected to the control of increase and reduction in accordance with a load state in a case of a "normal load", but is set to be a fixed shortest time in a case of a "light load".

Figure 3:
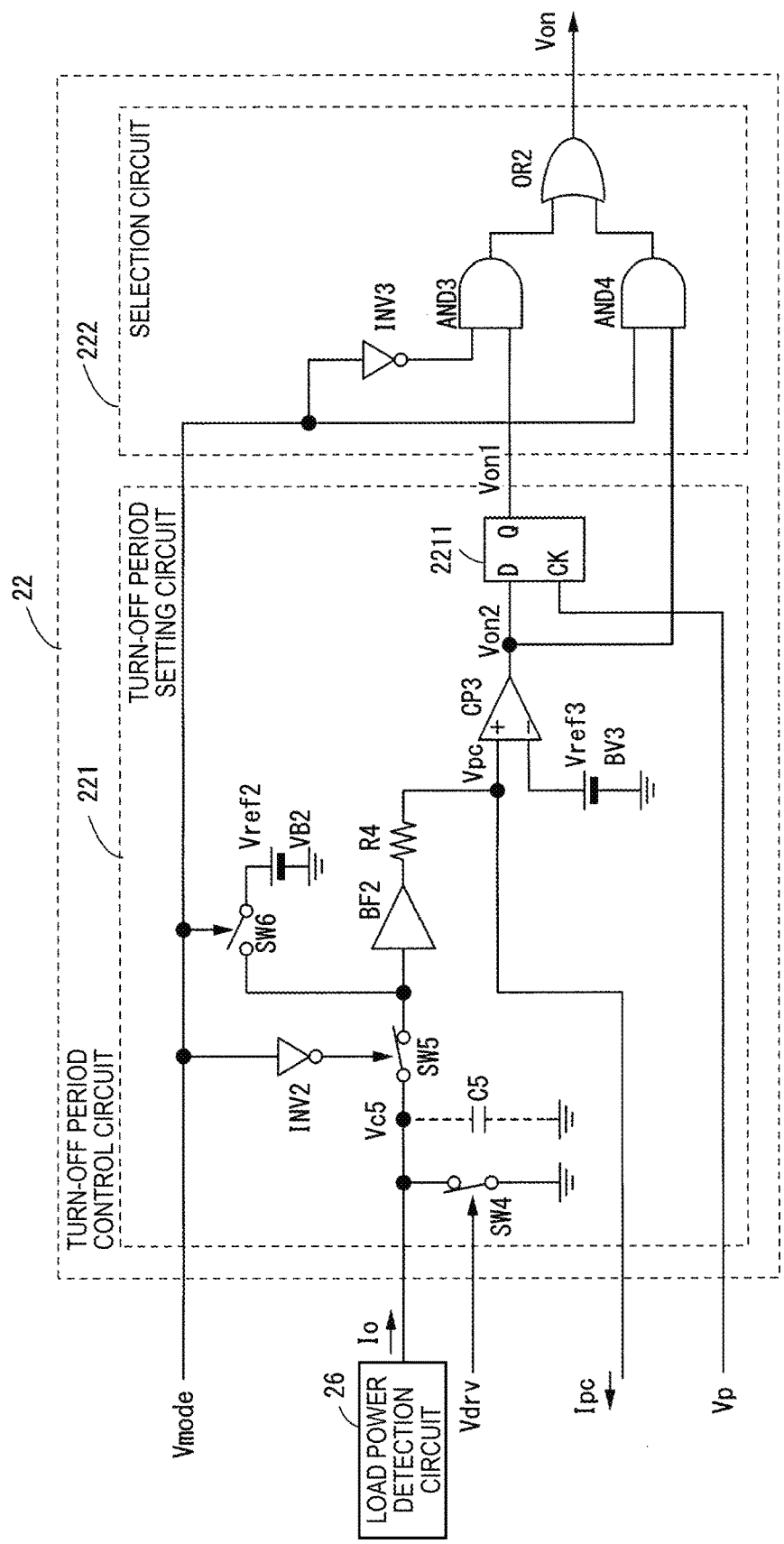
FIG. 3 is a circuit diagram of a turn-off period control circuit of the switching power supply device of FIG. 1.

FIG. 3 shows a detailed diagram of the turn-off period control circuit 22. The turn-off period control circuit 22 includes a turn-off period setting circuit 221 and a selection circuit 222.

The turn-off period setting circuit 221 includes a switch SW4 which is turned on when the driving voltage Vdrv is set to "H", the above-described external capacitor C5, a switch SW5 which is turned off when the mode switching voltage Vmode is set to "H" (light load), a switch SW6 which is turned on when the mode switching voltage Vmode is set to "H" (light load), a voltage source VB2 having the voltage of Vref2, a buffer BF2, a resistor R4, a comparator CP3, a first Delayed Flip-flop (DFF) 2211, and a voltage source VB3 having a voltage Vref3. In addition, the first DFF 2211 latches an output voltage Von2 of the comparator CP3 in synchronization with a rise in an output pulse Vp of the inversion detection circuit 27, and outputs the latched output voltage as a turn-on timing voltage Von1.

In the turn-off period control circuit 22, when the switching transistor MN1 is turned off by the driving voltage Vdrv being set to "L", the switch SW4 is turned off so that the capacitor C5 is charged by an output current Io of the load power detection circuit 26 and the voltage of the capacitor C5 is set to Vc5. The voltage Vc5 gradually becomes higher, and the switch SW5 is turned on and the switch SW6 is turned off when a load state is a "normal load" and the mode switching voltage Vmode is set to "L", and thus the voltage is input to a non-inversion input terminal of the comparator CP3 as a voltage Vpc through the buffer BF2 and the resistor R4. The optocoupler current Ipc flowing in this case becomes smaller with the elapse of time after the electrical conduction of the diode D1 from a point in time when the switching transistor MN1 is turned off, and thus a voltage drop of the resistor R4 becomes small gradually, and the voltage Vpc gradually rises.

When the voltage Vpc becomes higher than a reference voltage Vref3, a turn-on timing voltage Von2 which is output from the comparator CP3 is set to "H". The turn-on timing voltage Von2 is latched in the first DFF circuit 2211 by a rise in the pulse Vp which is output from the inversion detection circuit 27, and is output as the turn-on timing voltage Von1. A generation timing of the turn-on timing voltage Vo1 in this case becomes earlier as the load power signal Io becomes larger and the optocoupler current Ipc becomes smaller, and a turn-off period is shortened.

A timing when the pulse voltage Vp rises is a timing corresponding to a valley (the peak of the pulsating voltage Vrise) of a ringing in discontinuous conduction mode (DCM) of a drain voltage of the switching transistor MN1 because the pulsating voltage Vrise generated by the winding L3 is set to "H" when becoming higher than a reference voltage Vref4, as described later.

On the other hand, when a load state is a "light load" and the mode switching voltage Vmode is set to be "H", the switch SW5 is turned off and the switch SW6 is turned on, so that the voltage Vref2 of the voltage source VB2 is input to the input side of the buffer BF2 and changes to a voltage Vpc through the resistor R4. The voltage Vpc gradually rises by the optocoupler current Ipc becoming smaller with the elapse of time, and an output of the comparator CP3 is set to "H" when the voltage Vpc becomes higher than the reference voltage Vref2. A generation timing of a turn-on timing voltage Vo2 in this case becomes later as the optocoupler current Ipc increases, and a turn-off period increases.

The selection circuit 222 includes AND circuits AND3 and AND4, an OR circuit OR2, and an inverter INV4. When Vmode="L" (normal load), the AND3 is available, therefore, the output voltage Von1 of the first DFF 2211 is selected as the output of turn-on timing voltage Von. In this case, the voltage Vo2 is subjected to re-timing by the pulse voltage Vp to change to the voltage Vo1, and thus a turn-on timing of the switching transistor MN1 is set to be a timing corresponding to a valley of a ringing in DCM of a drain voltage Vd thereof, which allows a quasi-resonance operation. For this reason, the turn-on timing of the switching transistor MN1 is not affected by variations in the threshold value thereof.

On the other hand, when Vmode="H" (light load), the AND4 gate is available, therefor, the output voltage Von2 of the comparator CP3 is selected as the output of the turn-on timing voltage Von. In this case, the control of re-timing based on the pulse voltage Vp is not performed.

Figure 4A:
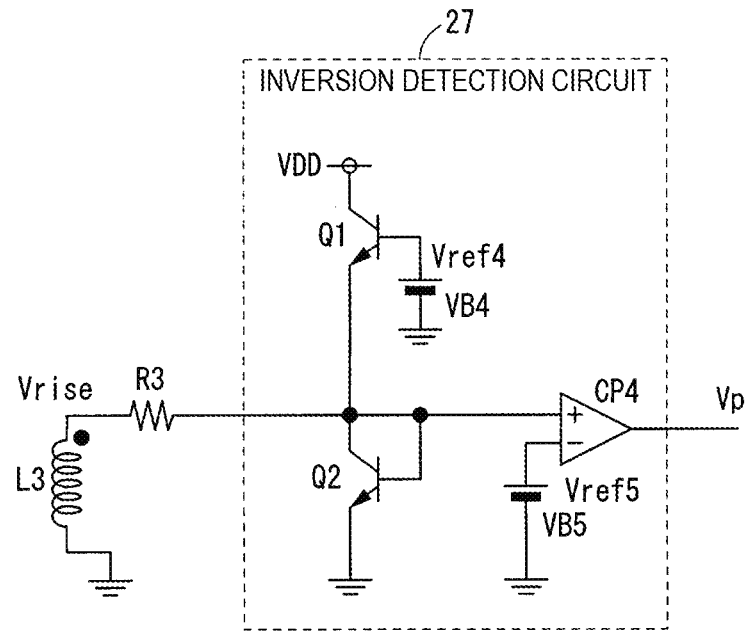
FIGS. 4A and 4B are circuit diagrams of an inversion detection circuit of the switching power supply device in FIG. 1.
Figure 4B:
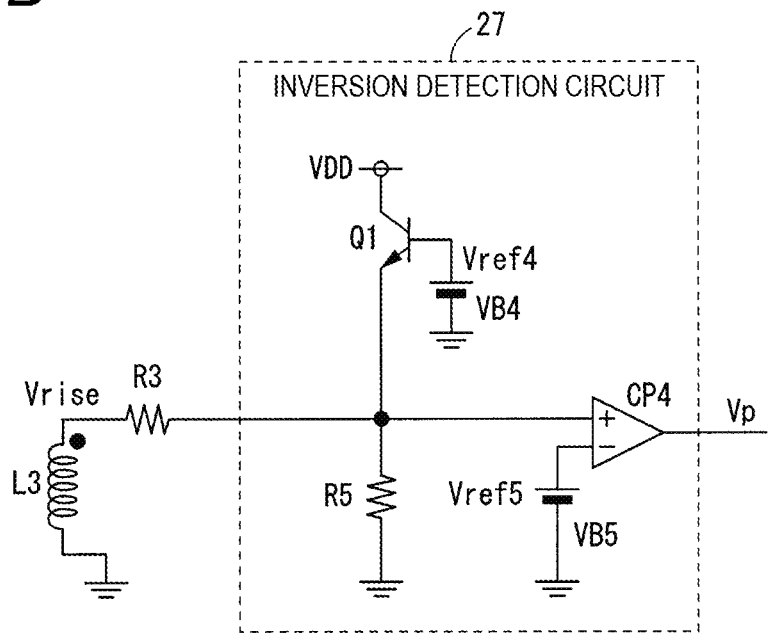

FIGS. 4A and 4B shows detailed diagrams of the inversion detection circuit 27. The inversion detection circuit 27 includes a voltage source BV4 of the voltage Vref4, an NPN transistor Q1, an NPN transistor Q2, a voltage source VB5 of a voltage Vref5, and a comparator CP4, as illustrated in FIG. 4A. The transistor Q1 constitutes a minimum voltage regulation circuit, and restricts the voltage of a non-inversion input terminal of the comparator CP4 to "Vref4-Vbe (Q1)" when a pulsating voltage Vrise is generated in the auxiliary winding L3 having its • side set to a negative polarity. Here, Vbe (Q1) is a voltage between a base and an emitter of the transistor Q1. The transistor Q2 constitutes a maximum voltage regulation circuit, and restricts the voltage of a non-inversion input terminal of the comparator CP4 to Vbe (Q2) when the pulsating voltage Vrise is generated in the auxiliary winding L3, the voltage having a positive polarity on the • side of the auxiliary winding. Here, Vbe (Q2) is a voltage between a base and an emitter of the transistor Q2. The pulsating voltage Vrise is subjected to waveform-shaping on the basis of the voltage Vref5.

Meanwhile, the inversion detection circuit 27 may replace the transistor Q2 with a resistor R5, as illustrated in FIG. 4B. In this case, the pulsating voltage Vrise having a positive polarity on the • side is divided by the resistors R3 and R4, thereby allowing a maximum voltage to be regulated.

Figure 5:
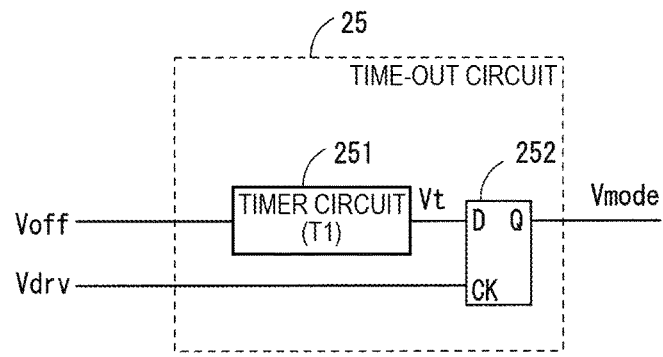
FIG. 5 is a circuit diagram of a time-out circuit of the switching power supply device in FIG. 1.

FIG. 5 shows a detailed diagram of a time-out circuit 25. The time-out circuit 25 includes a timer circuit 251 and a second Delayed Flip-flop (DFF) 252. The timer circuit 251 starts time counting when the turn-off timing voltage Voff is set to "H", and the output voltage Vt to "L" at the same time. After the predetermined time T1 is counted up, the output voltage Vt to "H" At the second DFF 252, the output Q connected with the output Vmode is set to "H" at the same time that the Vdrv, which is the output Q of RSFF 23, is changed from "L" to "H" in the case that the output Vt of the timer circuit 251 is "H". On the other hand, in the case that the output Vt is "L", the output Q of the second DFF 252 is kept on "L".

Therefore, the voltage Vmode is set to "H" in the case that the voltage Vdrv is set to "H" when the output voltage Vt of the timer circuit 251 is set to "H". And next, the output voltage of the timer circuit 251 is changed from "H" to "L" when the turn-off timing voltage Voff is set to "H". When the voltage Vdrv is not set to "H" before the time T1 determined by timer circuit 251 elapses and is set to "H" after the time elapses, the output voltage Vt of the timer circuit 271 is set to "H", and thus the voltage Vmode of the Q terminal of the second DFF 252 is changed from "H". When the output voltage Vt of the timer circuit 251 is set to "L" by the turn-off timing voltage Voff being set to "H", and thereafter, the voltage Vdrv is set to "H" before the time T1 elapses, the mode switching voltage Vmode is set to "L".

Figure 6:
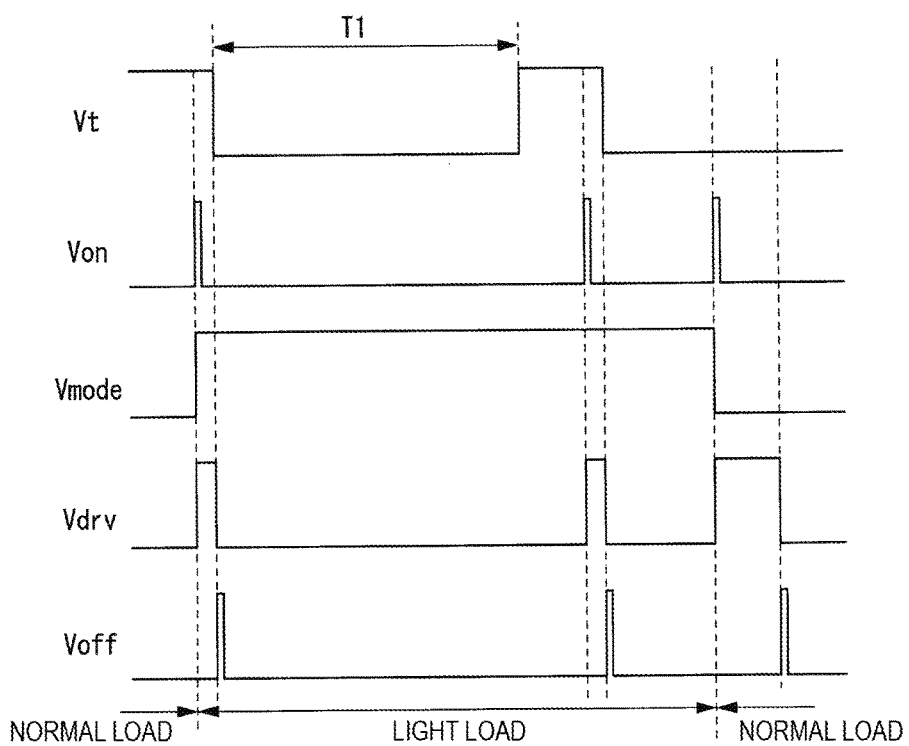
FIG. 6 is a waveform chart illustrating the operation of the time-out circuit of the switching power supply device in FIG. 1.

In this manner, when an interval in which the voltage Vdrv is set to "H", that is, a period of a turn-on timing of the switching transistor MN1 exceeds the timer period T1, the mode switching voltage Vmode is set to "H", which indicates that a driving period of the switching transistor MN1 is long, that is, the present operation state is a "light load". On the other hand, when the interval in which the voltage Vdrv is set to "H" is within the timer period T1, the mode switching voltage Vmode is set to "L", which indicates that the driving period of the switching transistor MN1 is short, that is, the present operation state is a "normal load". FIG. 6 shows waveform chart illustrating the operation of the time-out circuit 25.

It is possible to adjust the switching frequency of the transistor MN1 in which the mode switching voltage Vmode set to be "H" by appropriately setting the time T1 determined by timer circuit 251 in the time-out circuit 25, and thus it is possible to prevent audible frequency noise from being generated in a "normal load" when the frequency is set to be equal to or greater than an audible frequency upper limit (20 kHz).

Figure 7:
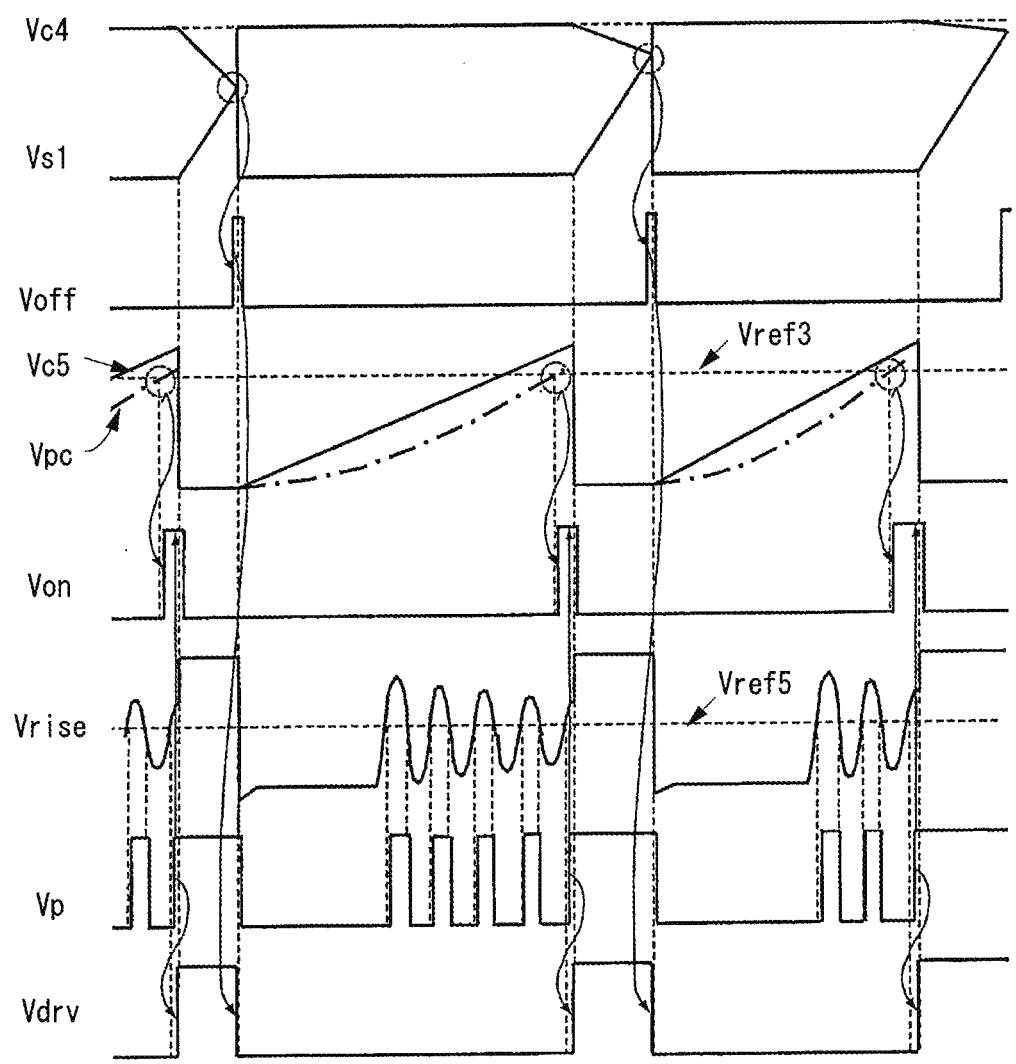
FIG. 7 is a waveform chart illustrating the operation of the switching power supply device in FIG. 1 in a "normal load".

FIG. 7 shows a waveform chart illustrating operation in a case where an operation state is a "normal load". In this case, since the mode switching voltage Vmode is set to "L", the turn-off timing voltage Voff1 is selected in the turn-on period control circuit 21 and is output as a voltage Voff. When the switching transistor MN1 is turned off by the voltage Vdrv due to the generation of the voltage Voff, the sense voltage Vs1 is changed to 0V, and thus the voltage Voff also is changed to 0V. Therefor, the form of the voltage Voff becomes a square wave pulse.

In addition, the turn-on timing voltage Von1 is selected as the output of the voltage Von in the turn-off period control circuit 22. When the switching transistor MN1 is turned on by the voltage Vdrv due to the generation of the voltage Von, the switch SW4 is turned on and the voltage Vc5 is changed to 0V, and thus the voltage Von also is changed to 0V. Therefor, the form of the voltage Von becomes a square wave pulse.

In the above-described "normal load", the output voltage Vout becomes higher than a target voltage in a case where a load connected to the second winding L2 side is low, and thus the optocoupler current Ipc increases. For this reason, in a turn-on period of the switching transistor MN1, a larger amount of charge of the capacitor C4 of the turn-on period control circuit 21 is discharged by the optocoupler current Ipc, and the voltage Vc4 of the capacitor C4 is greatly decrease. In this case, the rate of increase in the drain current Id of the switching transistor MN1 per hour is determined in accordance with the input voltage Vin and inductance of the winding L1 on the first winding L11 side, and is constant regardless of a load state. For this reason, when the voltage of the capacitor C4 is greatly decreased, a time until the output voltage Voff1 of the comparator CP1 is set to "H" decreases. That is, the turn-on period of the switching transistor MN1 is reduced.

On the other hand, in a turn-off period of the switching transistor MN1, the voltage greatly drops due to the resistor R4 of the turn-off period control circuit 22 when the optocoupler current Ipc is large, and the time until the output voltage Von1 of the comparator CP3 is set to "H" increases. Meanwhile, the output current Io of the load power detection circuit 26 decreases when the turn-on period of the switching transistor MN1 is short, and thus the rate of increase in the voltage Vc5 of the capacitor C5 decreases. Therefore, in a case where a load is light, the turn-off period of the switching transistor MN1 is increased.

As described above, in a case where a load is light in a "normal load", the turn-on period of the switching transistor MN1 is reduced and the turn-off period thereof is increased, and thus a duty ratio is decreased and a switching period is increased.

On the other hand, in a case where a load current flowing to the second winding L2 is large, that is, a load is heavy, the output voltage Vout is decreased, and thus the optocoupler current Ipc is decreased. For this reason, the turn-on period and the turn-off period of the switching transistor MN1 are opposite to those in a case where a load is light. That is, the turn-on period is increased and the turn-off period is decreased, whereby the duty ratio is increased and the switching period is reduced.

Figure 8:
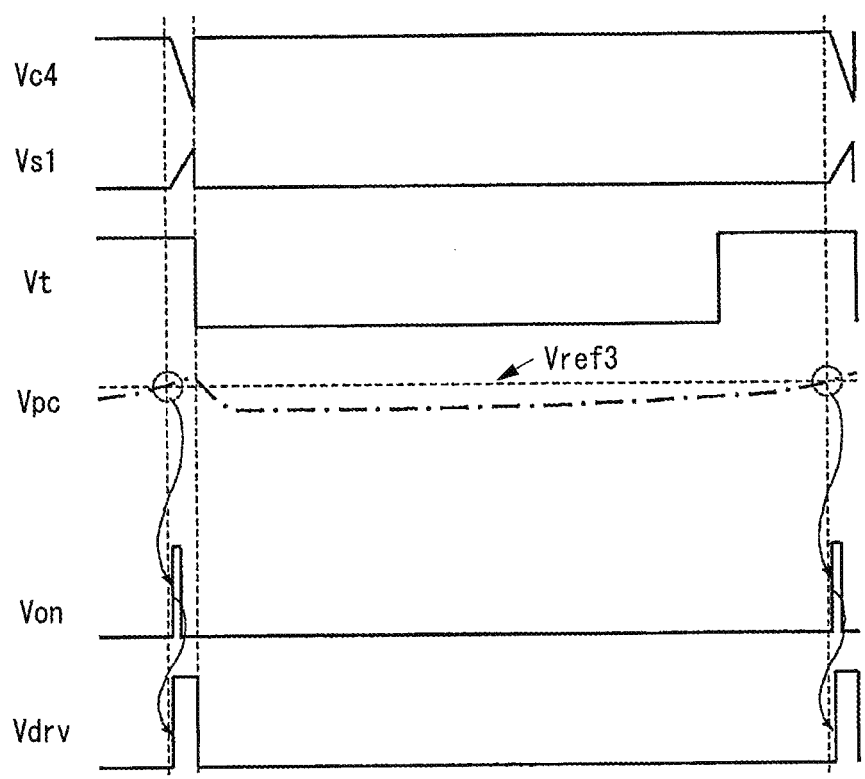
FIG. 8 is a waveform chart illustrating the operation of the switching power supply device in FIG. 1 in a "light load".

FIG. 8 shows a waveform chart illustrating operation in a case where a load state is a "light load". In this case, since the mode switching voltage Vmode is set to "H", the turn-off timing voltage Voff2 is selected in the turn-on period control circuit 21 and is output as the voltage Voff, and the turn-on timing voltage Von2 is selected in the turn-off period control circuit 22 and is output as the voltage Von.

In this case, in the turn-on period control circuit 21, since the capacitor C6 is charged with a constant current by the current Iref1 by the switch SW3 being turned off when the switching transistor MN1 is turned on, the turn-off timing voltage Voff2 is set to "H" when the voltage Vc6 of the capacitor C6 exceeds the voltage Vref1, and thus the switching transistor MN1 is turned off. The turn-on period of the switching transistor MN1 in this case is set to be a fixed time which is determined by the current Iref1 and the capacitor C6, regardless of the output voltage Vout.

In the turn-off period control circuit 22, the switch SW5 is turned off and the switch SW6 is turned on, and thus the voltage Vref2 is applied to the resistor R4. When the voltage Vpc becomes higher as the optocoupler current Ipc decreases and exceeds the voltage Vref3, the output voltage Von2 of the comparator CP3 is set to "H" and is output as the turn-on timing voltage Von. The current Icp becomes larger as the output voltage Vout increases, but becomes smaller in proportion to a decrease in the output voltage Vout. Accordingly, as the output voltage Vout at a point in time when the switching transistor MN1 is turned off increases, a time until the optocoupler current Ipc decreases to such an extent that the voltage Vpc exceeds the voltage Vref3 increases. That is, a timing when the turn-on timing signal Von is set to "H" becomes later as the output voltage Vout of the switching transistor MN1 increases, and the turn-off period is increased.

In this manner, the switching transistor MN1 in a case where a load state is a light load is controlled such that the turn-on period is fixed and the turn-off period becomes longer as the output voltage Vout during a turn-off timing of the switching transistor MN1 increases.

Second Embodiment

Figure 9:
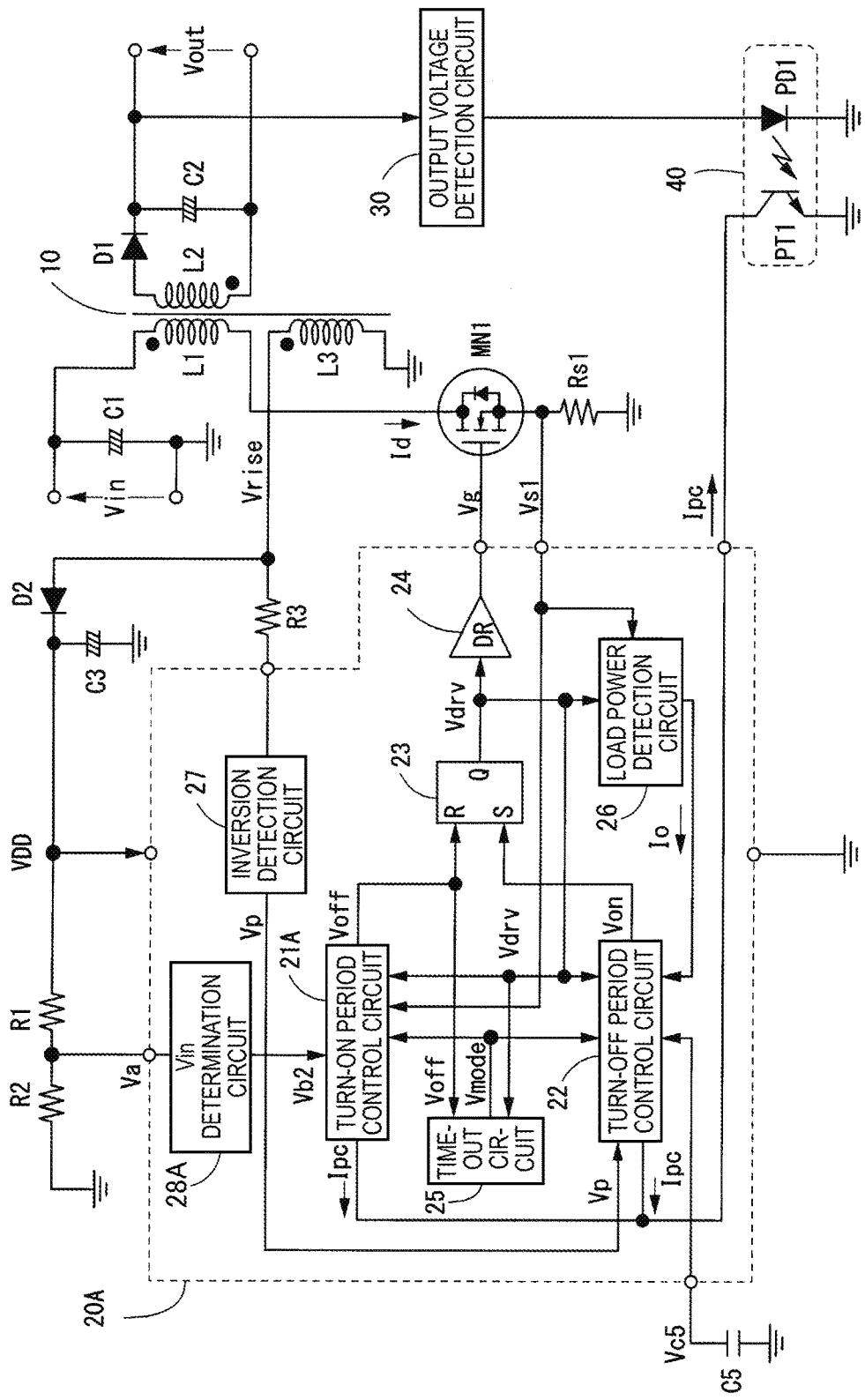
FIG. 9 is a block diagram illustrating a configuration of a switching power supply device according to a second embodiment.

FIG. 9 shows a configuration of a switching power supply device according to a second embodiment of the invention. The switching power supply device according to the second embodiment is different from the switching power supply device according to the first embodiment in a configuration of a control circuit 20A, and particularly, configurations of a turn-on period control circuit 21A and a Vin determination circuit 28A. In this example, a turn-on period is determined in accordance with an optocoupler current Ipc without using an external capacitor C4 during a normal load operation. In addition, a shortest turn-on period having a value of an input voltage Vin added thereto is determined during a light load. The same components as those in the first embodiment are denoted by the same reference numerals and signs.

Figure 10:
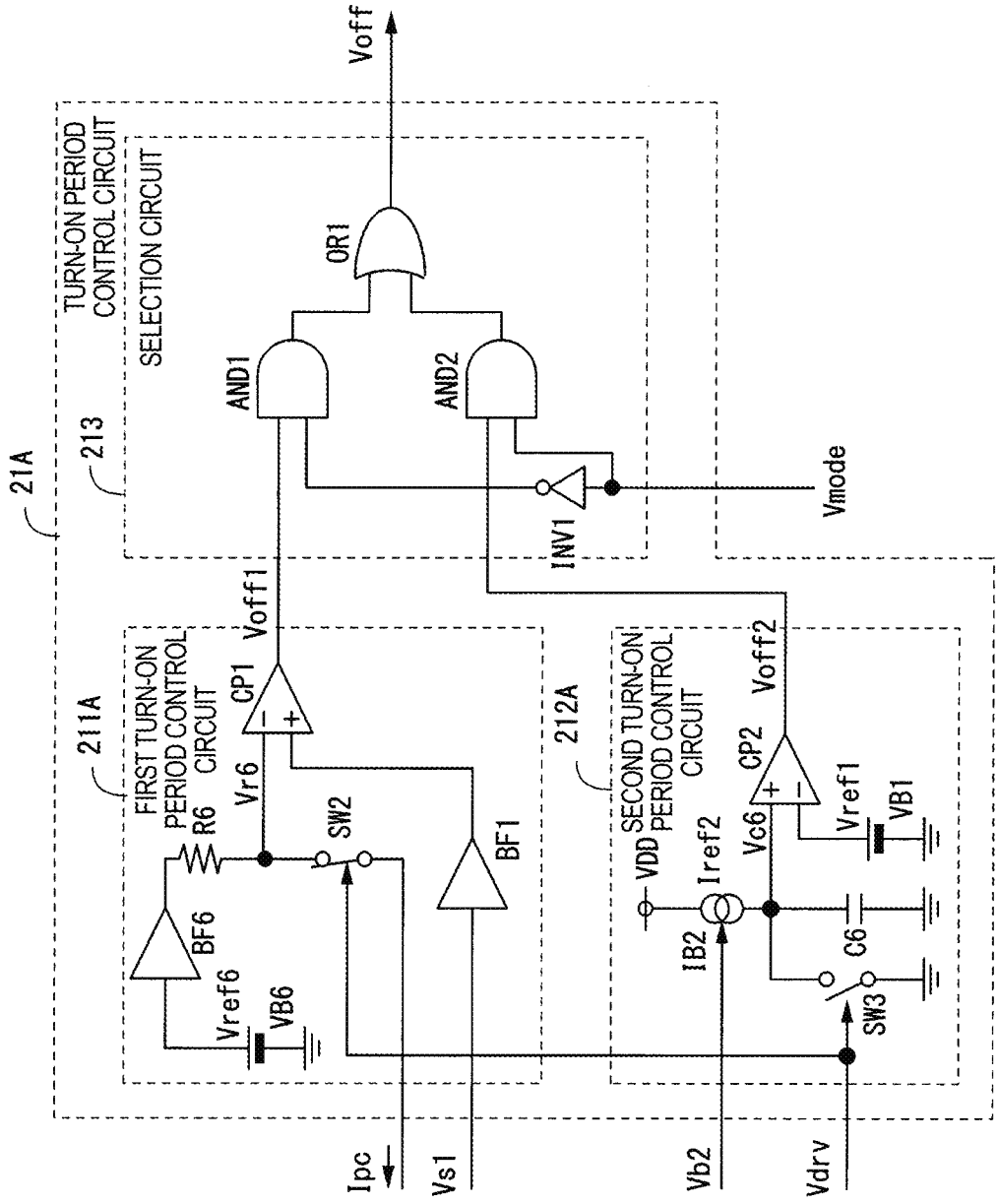
FIG. 10 is a circuit diagram of a turn-on period control circuit of the switching power supply device in FIG. 9.

FIG. 10 shows a detailed diagram of the turn-on period control circuit 21A. The turn-on period control circuit 21A includes a first turn-on period control circuit 211A that outputs a turn-off timing voltage Voff1, a second turn-on period control circuit 212A that outputs a turn-off timing voltage Voff2, and a selection circuit 213 that selects either the output voltage Voff1 of the first turn-on period control circuit 211A or the output voltage Voff2 of the second turn-on period control circuit 212A in accordance with a mode switching voltage Vmode.

The first turn-on period control circuit 211A includes a voltage source VB6 of a reference voltage Vref6, a buffer BF6, a resistor R6, a switch SW2 which is turned on when a driving voltage Vdrv is set to "H", a buffer BF1 that amplifies a sense voltage Vs1, and a comparator CP1.

The voltage Vr6 of the resistor 6 is set to be a reference voltage Vref6 by the switch SW2 being turned off when the switching transistor MN1 is turned off. However, the optocoupler current Ipc flows to the resistor R6 by the switch SW2 being turned on when the switching transistor MN1 is turned on, the voltage drop of "R6×Ipc" occurs in the resistor R6, and the voltage Vr6 is as follows.

$$Vr6 = Vref6 - R6 \times Ipc \quad (1)$$

On the other hand, the sense voltage Vs1 is input to the buffer BF1, and the sense voltage Vs1 and the voltage Vr6 are compared with each other by a comparator CP1. The comparator CP1 sets the turn-off timing voltage Voff1 to be "H" when the sense voltage Vs1 becomes higher than the voltage Vr6.

A change in the sense voltage Vs1 after the switching transistor MN1 is turned on is as follows.

$$Vs1 = Rs1 \times Vin/L1 \times ton \quad (2)$$

When the optocoupler current Ipc increases, the voltage Vr6 decreases. Accordingly, a time between when the switching transistor MN1 is turned on and when the sense voltage Vs1 becomes higher than the voltage Vr6 and the turn-off timing voltage Voff1 which is output from the comparator CP1 is set to be "H", that is, a time until the switching transistor MN1 is turned off (turn-on period) is reduced.

According to the equation (2), a change with respect to a time of the sense voltage Vs1 is proportional to the magnitude of the input voltage Vin. When the optocoupler current Ipc is in a constant state and the input voltage Vin increases, a time between when the switching transistor MN1 is turned on and when the sense voltage Vs1 becomes higher than the voltage Vr6 is reduced.

In this manner, the first turn-on period control circuit 211A makes a timing for setting the turn-off timing voltage Voff1 to be "H" earlier as the optocoupler current Ipc increases and the sense voltage Vs1 increases, to perform control for shortening a time for which the switching transistor MN1 is turned on. That is, a turn-on period of the switching transistor MN1 becomes shorter as the output voltage Vout increases, the input voltage Vin increases, and the sense voltage Vs1 increases.

The second turn-on period control circuit 212A includes a switch SW3 which is turned off when the driving voltage Vdrv is set to "H", a current source IB2 that supplies a current Iref2, a capacitor C6, and a comparator CP2 in which a voltage Vref1 is set as a reference value by a voltage source VB1. The current value of Iref2 flowing from the current source IB2 controlled by the input voltage determination circuit 28A becomes larger when the input voltage Vin increases.

A voltage Vc6 of the capacitor C6 is set to 0 V because the switch SW3 is turned on when the switching transistor MN1 is turned off. However, the switch SW3 is turned off when the switching transistor MN1 is turned on, and thus the voltage Vc6 is charged with the current Iref2 of the current source IB2 and becomes higher in proportion to time, and the turn-off timing voltage Voff2 which is output from the comparator CP2 is set to "H" when the voltage Vc6 becomes than the voltage Vref2 with the elapse of a predetermined time.

That is, at the turn-on time second control circuit 212A, the turn-off timing voltage Voff2 is set to "H" when a predetermined time by the value of the input voltage Vin passes after the switching transistor MN1 is turned on. That predetermined time is shorter than the minimum time determined by the turn-on time first control circuit 211A, moreover, that predetermined time becomes shorter as the input voltage Vin increases. Meanwhile, in the case that the capacitor C6 is connected on the outside, it is more easily to set that predetermined time.

In this manner, on the turn-on period control circuit 21A according to the second embodiment, the off-switching timing of the transistor MN1 is controlled by the voltage Voff1, and it becomes dynamically changed from a turn-on state to a turn-off state following load condition (optocoupler current Ipc) in the "normal load" state, but other hand, in the "normal load" state, the turn-off timing voltage Voff1 is changed from a turn-on signal to a turn-off when a period time that is controlled by the voltage Vin is passed from a point of turn-on timing. In this manner, a turn-on period between a turn-on timing and a turn-off timing of the switching transistor MN1 is subjected to the control of increase and reduction in accordance with a load state in a case of a "normal load", and is subjected to the control of increase and reduction in accordance with the input voltage Vin in a case of a "light load".

Figure 11:
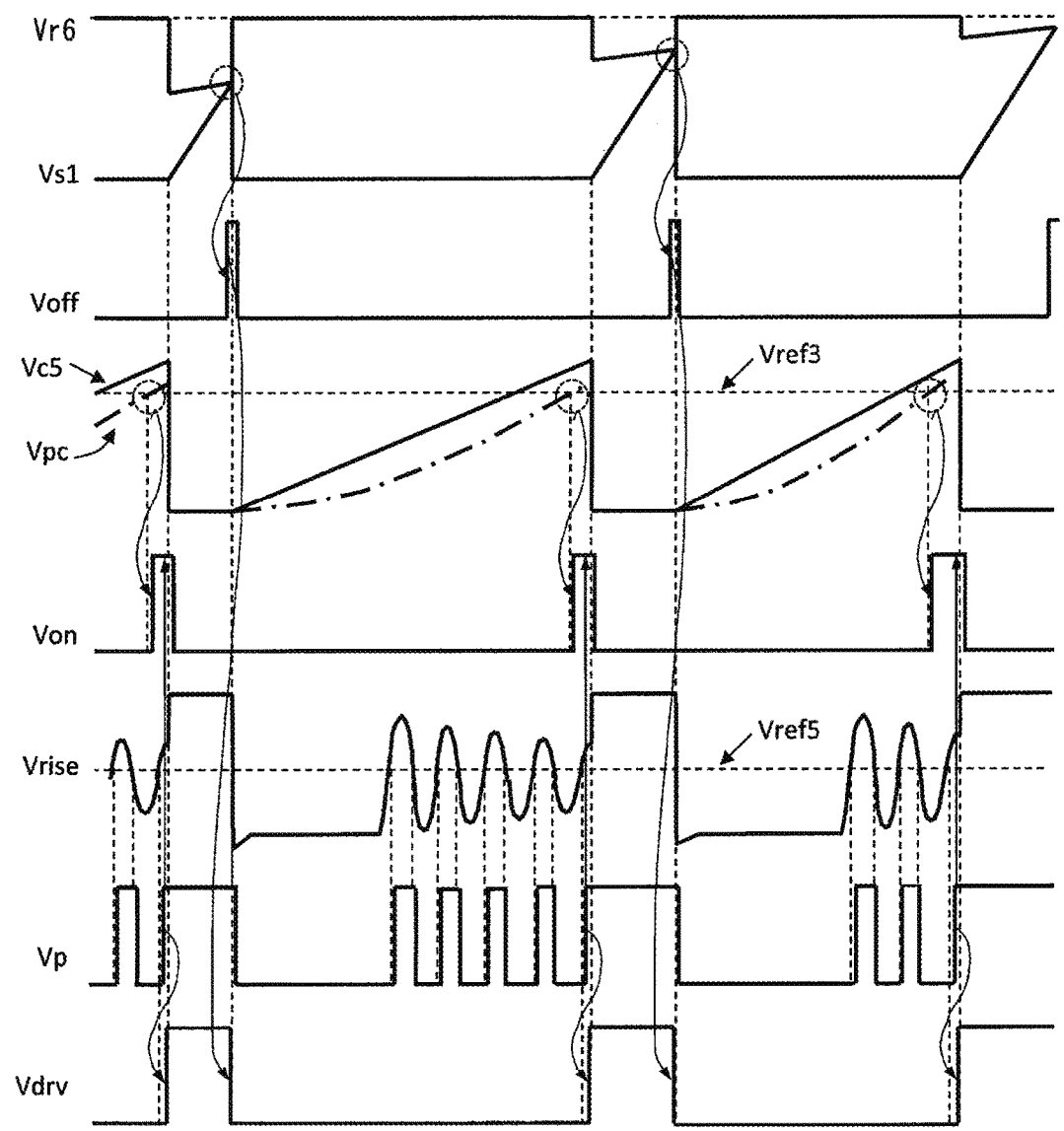
FIG. 11 is a waveform chart illustrating the operation of the switching power supply device in FIG. 9 in a "normal load".
Figure 12:
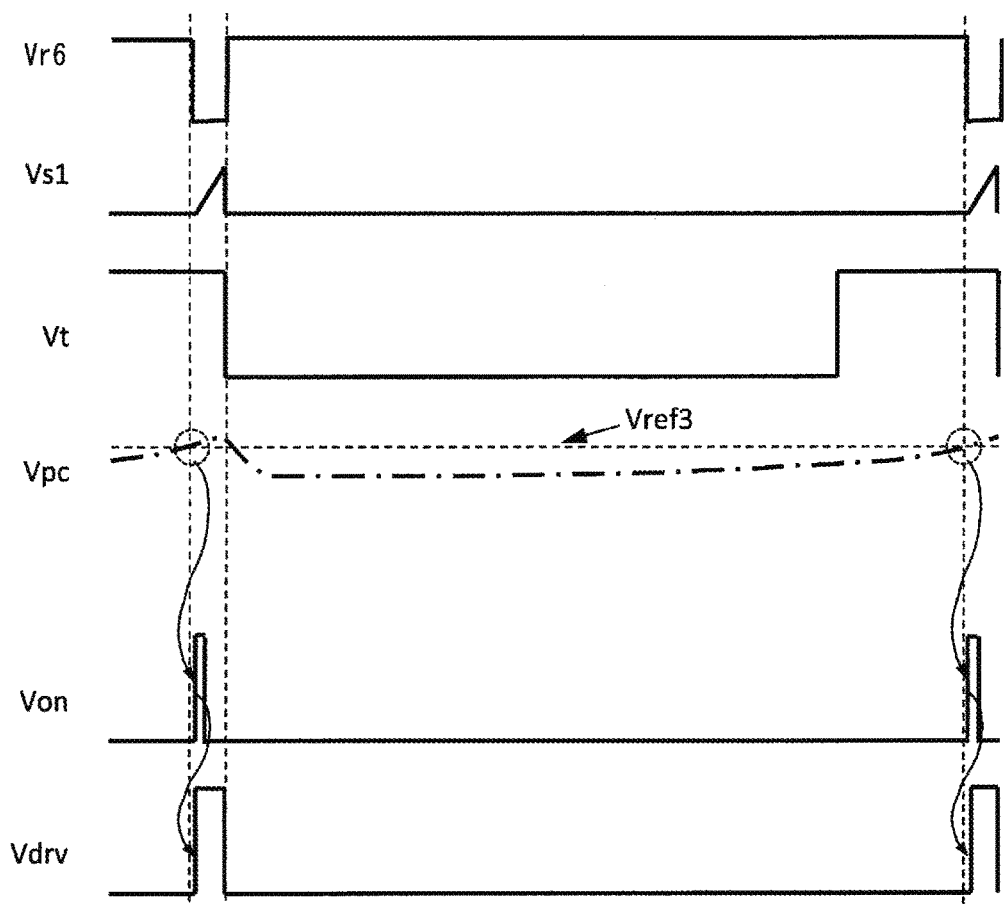
FIG. 12 is a waveform chart illustrating the operation of the switching power supply device in FIG. 9 in a "light load".
Figure 13:
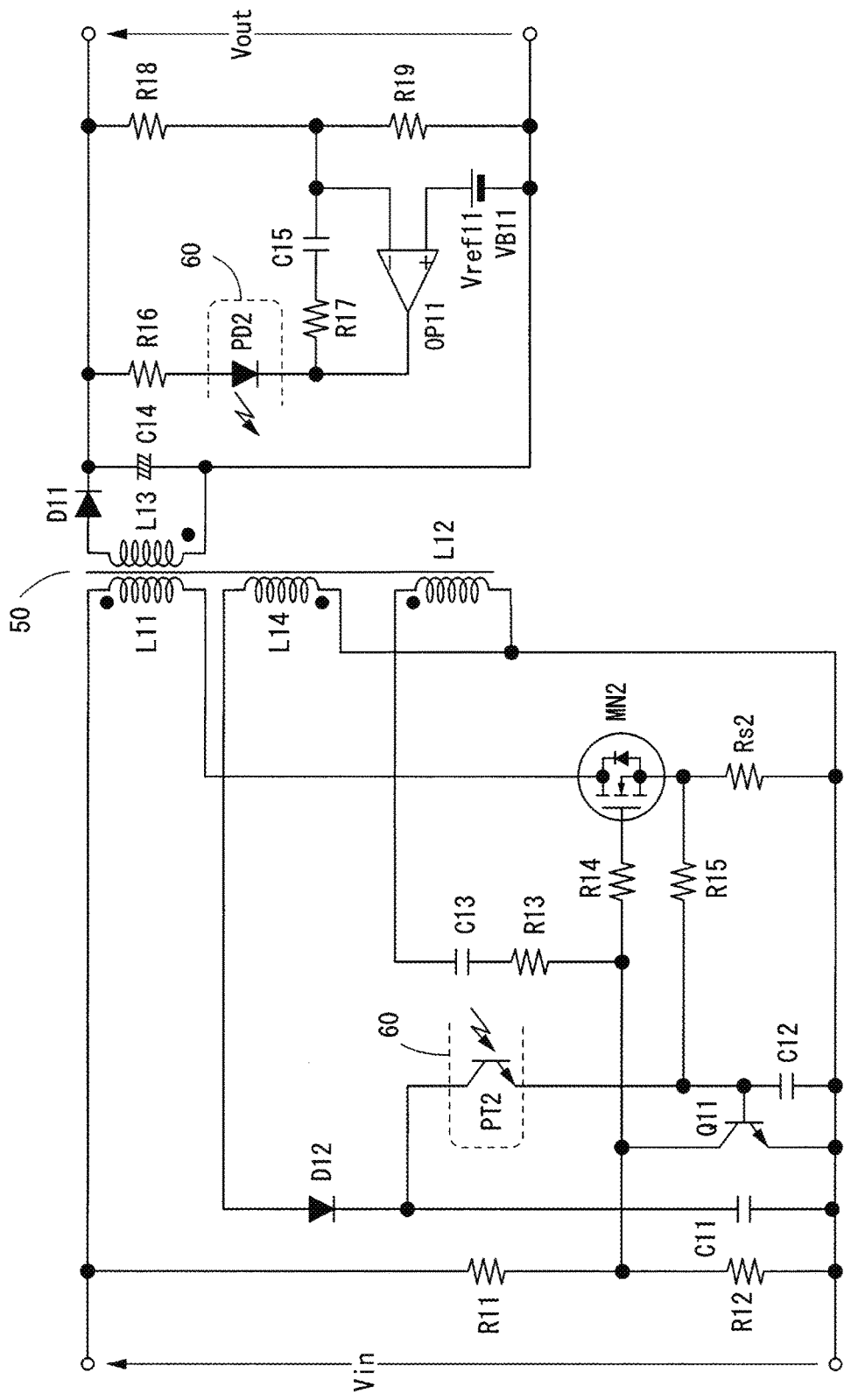
FIG. 13 is a block diagram illustrating a configuration of a switching power supply device of the related art.

FIG. 11 shows a waveform chart illustrating operation in a case of a "normal load" of the switching power supply device according to the second embodiment, and FIG. 12 shows a waveform chart illustrating operation in a case of a "light load".

DESCRIPTION OF REFERENCE NUMERALS AND SIGNS

10: TRANSFORMER
L1: PRIMARY WINDING
L2: SECONDARY WINDING
L3: AUXILIARY WINDING
20, 20A: CONTROL CIRCUIT
21, 21A: TURN-ON PERIOD CONTROL CIRCUIT
211, 211A: FIRST TURN-ON PERIOD CONTROL CIRCUIT
212, 212A: SECOND TURN-ON PERIOD CONTROL CIRCUIT
213: SELECTION CIRCUIT
22: TURN-OFF PERIOD CONTROL CIRCUIT
221: TURN-OFF PERIOD SETTING CIRCUIT
222: SELECTION CIRCUIT
23: Set-Reset flip-flop CIRCUIT
24: DRIVING CIRCUIT
25: TIME-OUT CIRCUIT
26: LOAD POWER DETECTION CIRCUIT
27: INVERSION DETECTION CIRCUIT
28, 28A: INPUT VOLTAGE DETERMINATION CIRCUIT
30: OUTPUT VOLTAGE DETECTION CIRCUIT
40: OPTOCOUPLER

What is claimed is:

1. A switching power supply device comprising:
    a switching transistor;
    a sense resistor connected to the switching transistor in series and on which a sense voltage generates when the switching transistor is turned on;
    a transformer including a first winding to which an input voltage is applied when the switching transistor is turned on and a second winding connected to a load;
    an optocoupler in which an optocoupler current is generated based on an output voltage on the second winding side;
    a load power detection circuit that generates a load power signal in accordance with a turn-on period of the switching transistor;
    a turn-on period control circuit;
    a turn-off period control circuit; and
    a Set-Reset flip-flop (SRFF) circuit,
    wherein the turn-on period control circuit generates a turn-off timing signal at an earlier timing as a current value of the optocoupler current is larger and a voltage value of the sense voltage is larger, the turn-off timing signal being a signal so as to turn off the switching transistor after the switching transistor is turned on,
    wherein the turn-off period control circuit generates a turn-on timing signal at an earlier timing as the current value of the optocoupler current is smaller and a current value of load power signal is larger, the turn-on timing signal being a signal so as to turn on the switching transistor after the switching transistor is turned off,
    wherein the SRFF circuit turns off the switching transistor in accordance with the turn-off timing signal output from the turn-on period control circuit and turns on the switching transistor in accordance with the turn-on timing signal output from the turn-off period control circuit, and
    wherein turn-on and turn-off timings of the switching transistor are controlled in accordance with the voltage value of the sense voltage, the current value of the optocoupler current, and the current value of the load power signal.

2. The switching power supply device according to claim 1, further comprising:
    an auxiliary winding provided in the transformer; and
    an inversion detection circuit,
    wherein the inversion detection circuit generates a pulse signal in which a pulsating voltage generated in the auxiliary winding is waveform-shaped and which transitions at a timing of a valley of a ringing in discontinuous conduction mode (DCM) of a drain voltage of the switching transistor, and
    wherein the turn-off period control circuit performs re-timing of the turn-on timing signal at a transition timing of the pulse signal.

3. The switching power supply device according to claim 2,
    wherein the turn-off period control circuit includes a fifth capacitor which is charged by a load power detection signal when the switching transistor is turned off and which is discharged when the switching transistor is turned on, a fourth resistor which is inserted into a path in which charge of the fifth capacitor is discharged by the optocoupler current, a third comparator which compares a voltage value of a terminal on a side opposite to a side of the fifth capacitor of the fourth resistor with a third reference voltage value, and a first Delayed Flip-flop (DFF) circuit which performs re-timing of an output signal of the third comparator at the transition timing of the pulse signal of the inversion detection circuit, and wherein the turn-on timing signal is generated from the first DFF circuit.

4. The switching power supply device according to claim 2, wherein the inversion detection circuit includes a minimum voltage regulation circuit which regulates a minimum voltage value when the pulsating voltage generated in the auxiliary winding is a negative voltage, a maximum voltage regulation circuit which regulates a maximum voltage value when the pulsating voltage generated in the auxiliary winding is a positive voltage, and a fourth comparator which compares a voltage value of a value generated in the auxiliary winding and regulated by the minimum voltage regulation circuit and the maximum voltage regulation circuit with a fifth reference voltage value and which performs waveform-shaping of the voltage so as to generate the pulse signal.

5. The switching power supply device according to claim 1, further comprising:

an input voltage determination circuit detecting a level of the input voltage, wherein the turn-on period control circuit generates the turn-off timing signal at an earlier timing as the level of the input voltage determined by the input voltage determination circuit is higher.

6. The switching power supply device according to claim 5, wherein the turn-on period control circuit includes a fourth capacitor which is charged to a lower voltage as a voltage value of the input voltage determined by the input voltage determination circuit is larger when the switching transistor is turned off and which is discharged by the optocoupler current when the switching transistor is turned on, and a first comparator which generates the turn-off timing signal when a voltage value of the fourth capacitor is lower than a voltage value corresponding to the sense voltage.

7. The switching power supply device according to claim 1, further comprising:

a time-out circuit, wherein the time-out circuit generates a mode switching signal when the turn-on timing signal is generated in the turn-off period control circuit after a first predetermined time elapses from when the turn-off timing signal is generated in the turn-on period control circuit, wherein the turn-on period control circuit generates the turn-off timing signal after a second predetermined time elapses from when the switching transistor is turned on, when the mode switching signal is generated in the time-out circuit, regardless of the current value of optocoupler current and the voltage value of the sense voltage.

8. The switching power supply device according to claim 7, wherein the turn-off period control circuit generates the turn-on timing signal at a later timing as the current value of the optocoupler current is larger, when the mode switching signal is generated in the time-out circuit, regardless of the load power signal.

9. The switching power supply device according to claim 8, wherein the turn-off period control circuit includes a second voltage source, a fourth resistor which is inserted into a current path of the optocoupler current flowing from the second voltage source, and a third comparator which compares a voltage value of a terminal on a side opposite to a side of the second voltage source of the fourth resistor with a third reference voltage value, and wherein the turn-on timing signal is generated from the third comparator.

10. The switching power supply device according to claim 7, wherein the turn-on period control circuit includes a sixth capacitor which is charged with a constant current when the switching transistor is turned on and which is discharged when the switching transistor is turned off, and a second comparator which generates the turn-off timing signal when a voltage value of a charged voltage of the sixth capacitor exceeds a first reference voltage value.

11. The switching power supply device according to claim 7, wherein the turn-on period control circuit includes a sixth capacitor which is charged with a larger current as the input voltage is larger when the switching transistor is turned on and which is discharged when the switching transistor is turned off, and a second comparator which generates the turn-off timing signal when a voltage value of a charged voltage of the sixth capacitor exceeds a first reference voltage value.

12. The switching power supply device according to claim 7, wherein the time-out circuit includes a timer circuit which generates a timer signal for the first predetermined time whenever the turn-off timing signal is input, and a second DFF circuit which generates the mode switching signal when the turn-on timing signal is input and the timer signal is not generated by the timer circuit.

13. The switching power supply device according to claim 1, wherein the turn-on period control circuit includes a fourth capacitor which is charged to a first predetermined voltage when the switching transistor is turned off and which is discharged by the optocoupler current when the switching transistor is turned on, and a first comparator which generates the turn-off timing signal when a voltage value of the fourth capacitor is lower than a voltage value corresponding to the sense voltage.

14. The switching power supply device according to claim 1, wherein the turn-on period control circuit includes a sixth resistor in which a voltage based on the current value of the optocoupler current flowing is generated when the switching transistor is turned on, and a first comparator which generates the turn-off timing signal when a voltage value of the voltage generated in the sixth resistor exceeds the voltage value of the sense voltage.

* * * * *